United States Patent [19]
De Putter

[11] 3,791,678
[45] Feb. 12, 1974

[54] PIPE COUPLING
[75] Inventor: Warner Jan De Putter, Hardenberg, Netherlands
[73] Assignee: Industriele Onderneming Wavin NV, Zowolle, Netherlands
[22] Filed: Feb. 22, 1972
[21] Appl. No.: 227,825

[52] U.S. Cl. .............................. 285/110, 285/379
[51] Int. Cl. ............................................. F16l 17/00
[58] Field of Search ..................... 285/110, 379, 380

[56] References Cited
UNITED STATES PATENTS
3,260,540  7/1966  Houot .............................. 285/110
3,265,410  8/1966  Lorang ............................. 285/110
2,284,869  6/1942  Hinderliter ....................... 285/110

FOREIGN PATENTS OR APPLICATIONS
281,193  12/1964  Netherlands ....................... 285/379
6,805,559  10/1968  Netherlands ....................... 285/379

Primary Examiner—Dave W. Arola
Attorney, Agent, or Firm—Wilkinson, Mawhinney & Theibault

[57] ABSTRACT

Pipe coupling comprising a pipe end inserted in a sleeve shaped coupling part, which consists of a stepped cylindrical widening of a pipe. The diameter of a first widening is larger than the outer diameter of the pipe end. The mouth of a second widening is partially narrowed and, in the second widening is situated a sealing ring of rubber, said sealing ring being provided with a lip. The sealing ring is retained by means of a thin walled retaining ring, which is preferably provided with notches for deformation.

3 Claims, 3 Drawing Figures

PATENTED FEB 12 1974　3,791,678

PIPE COUPLING

BACKGROUND OF THE INVENTION

My invention relates to a pipe coupling with a pipe end to be inserted in a sleeve-shaped coupling part, the coupling part consists of a stepped cylindrical widening of a pipe, while the first widening has an inner diameter which is larger than the outer diameter of the pipe to be inserted, the mouth of the second widening is partially narrowed, in the second widening is situated a sealing ring of rubber or like sealing material, which ring is provided with a lip directed inwards at an angle, the smallest diameter of which in its free condition is smaller than the inner diameter of the pipe end to be inserted, which sealing ring in the coupling part is retained by means of a retaining ring, means being provided to ensure that the retaining ring does not leave the coupling part.

A pipe coupling of this type is known, wherein the retaining ring has the shape of a clamping ring which presses the rubber sealing with a rather great clamping force both axially and radially against the inner walls of the second widening, while the mouth of the second widening has the shape of a radially inwards directed collar reaching to the vicinity of the outer circumference of the pipe end to be inserted and constituting, together with the whether or not conical bridge part between the first and second widening, the means which prevent the sealing ring from being moved in a longitudinal direction with respect to the pipe when the pipe end is inserted. This known construction has drawbacks resulting from the principle of the clamping of the sealing ring. The material of the sealing ring is necessarily rather heavy in order to ensure a suitable clamping, while in an axial direction between the clamping ring and the inwards directed collar also a rather large quantity of material should be available in order to prevent the sealing ring from being pulled between the clamping ring and the inner wall of the second widening when the pipe end is inserted.

SUMMARY OF THE INVENTION

It is now an object of the invention to obviate those difficulties. For that purpose the retaining ring holds the sealing ring in place, preferably in a non clamping way, and contacts itself an abutment face in the shape of a room in the vicinity of the end of the coupling part, which room is narrowed with respect to the size of the second widening, means being provided to prevent a displacement of the sealing ring in an axial direction when the pipe end to be inserted is introduced.

According to a preferred embodiment of the basic idea of the invention wherein as in the case of the aforementioned known construction the sealing ring is situated in the second widening the narrowing after the second widening continues as far as substantially the outer diameter of the retaining ring, and after this narrowing follows a third widening with a further narrowing, so that on the inner side of this further narrowing the abutment face for the widened end of the retaining ring is formed. This idea can be further elaborated in two ways. In the first place the further narrowing, like the collar which in the known construction is at the end of the mouth, can only be formed after the insertion of the sealing ring and the retaining ring.

According to the invention the retaining ring is, however, preferably provided with a number of notches extending substantially in the longitudinal direction, so that the ring becomes deformable and as a consequence the narrowing after the third widening can be made beforehand. After the insertion of the retaining ring and the expansion thereof the sealing ring will be stopped in the second widened part.

SURVEY OF THE DRAWINGS

Figure 1:
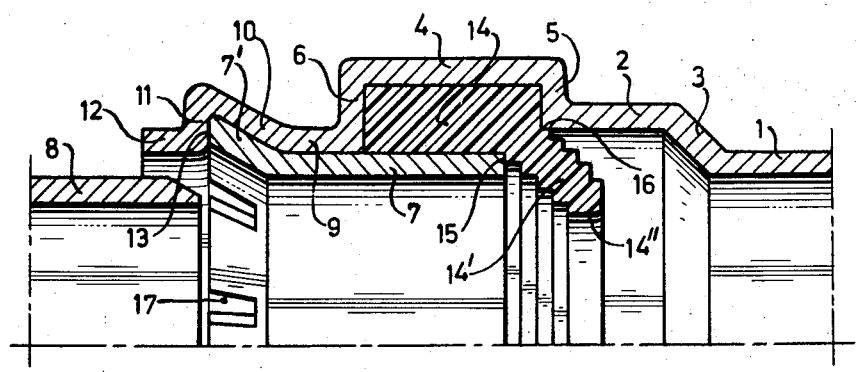
FIG. 1 shows a fragmentary axial section through a pipe end with a pipe coupling according to the invention.

DESCRIPTION OF A PREFERRED EMBODIMENT:

In FIG. 1 the undeformed pipe body is denoted by 1 on which pipe body a coupling part is formed, via a conically extending bridge part 3, by means of a first widening 2, while a second widening 4 adjoins the first widening 2 via a whether or not conical bridge part 5. After the second widening follows after a narrowing 6 which extends as far as the outer diameter of a preferably to a certain extent deformable retaining ring 7, the inner diameter is large enough to allow the introduction of the pipe piece 8 to be inserted. On the narrowing 6 may be provided a substantially cylindrical part 9, whereupon according to the invention a third widening 10 is provided which preferably has an undulatory or conical shape and which ends in a further and last narrowing 11 which may merge into a short cylindrical end part 12. The inner surface 13 of the further narrowing forms constitutes also an abutment against which comes to lie the end 7' of the retaining ring 7, which widens in a wavy or conical way. The retaining ring 7 is preferably a rather thin walled ring of elastical material, preferably of a thermoplastics such as pvc. This ring can be obtained by means of a blowing process. This also holds for the tube end with the widenings.

Figure 2:
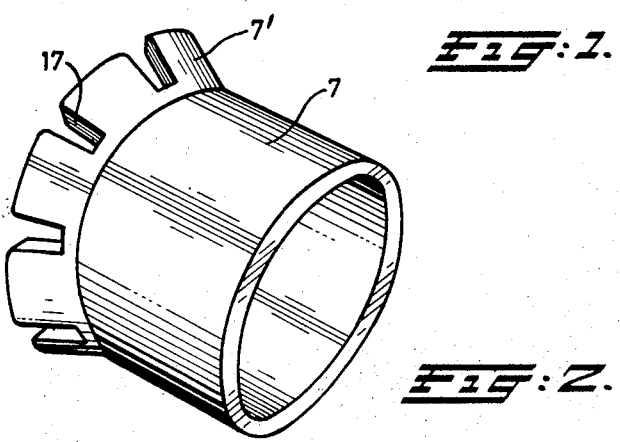
FIG. 2 shows a perspective view of the retaining ring in the embodiment according to FIG. 1.

In the space formed between the second widening 4 with the two bridge parts 5 and 6 on either side and the retaining ring 7 is the main body 14 of a sealing ring, which ring is provided with a skirt or lip extending inwards at an angle, the smallest diameter of which, consequently at the end edge of the lip denoted by 14'' in FIG. 2 is smaller that the outer diameter of the pipe piece 8 to be inserted. The pipe piece 8 can be freely passed through the ring 7 and bears then by a possibly slightly beveled end edge against the sealing lip 14' and will, when being further inserted, press the material of this lip against the first widening 2 and against the inner side of the first bridge part 3, the annular face 14'' ensuring the sealing.

The main body 14 of the rubber sealing ring is so situated in a non clamping way, possibly even with a small clearance in a radial direction, situated between the faces 4 and 7. In order to prevent, when the pipe end 8 is inserted, the material of the main body from being pulled from the aforementioned space it has been provided for that the retaining ring 7 has a sufficient length, so that between the corner 15 of the retainer ring and the corner 16 of the bridge part 5 between the first and second widening 2, 4 respectively a narrow area is formed while shape of the ring 14, 14' is adapted thereto.

The accommodation of the retaining ring 7 with its part 7' widening in a wavy or conical way can be effected by providing the further narrowing 11 only after the insertion of the rubber ring 14 and the retaining ring 7. It is, however, also possible and this is preferred to construct the retaining ring 7 in the way as represented in FIG. 2, by providing on the length of the conically widening part a row of e.g. longitudinal notches like 17. In this way the retaining ring which e.g. like the pipes 1 and 8 may consist of hard polyvinylchloride is deformable to a sufficient extent to provide the further narrowing 11 entirely beforehand and to insert in the coupling part the rubber ring 14 and subsequently the retaining ring 7. After expansion of the deformed retaining ring the widened part 7' comes than to lie against the face 13 so that the retaining ring is prevented from leaving the space within the coupling part.

Figure 3:
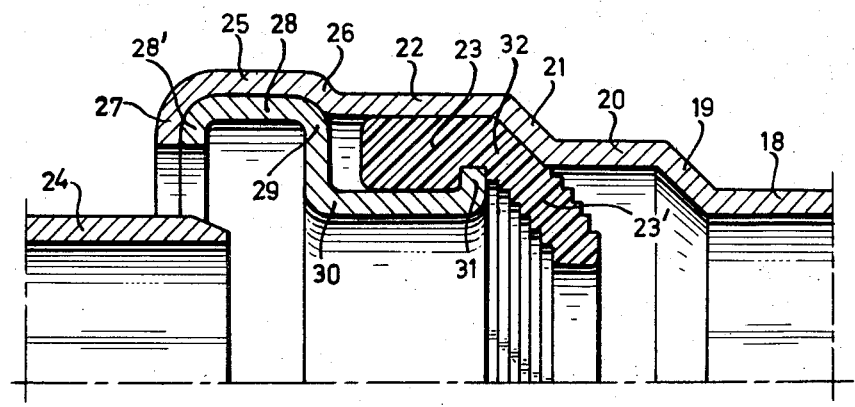
FIG. 3 shows another embodiment in a sectional view corresponding to that of FIG. 1.

FIG. 3 shows in a sectional view corresponding to that as represented in FIG. 1 a variant to the idea underlying the invention, according to this variant the sealing ring is not held clampingly in place by the retainer ring but nevertheless it is ensured that neither the sealing ring can be pulled from the space in which it is accommodated when the pipe end is inserted nor the retainer ring prior to the insertion of the pipe end can leave the space in the coupling part at the pipe end.

In FIG. 3 are consecutively visible the undeformed pipe material 18, the first bridge part 19 to the first widening 20, the second bridge part 21 to the second widening 22, the main body of the rubber sealing ring 23 and the inwards slanting skirt 23' thereof which by the pipe piece 24 to be inserted can be pressed against the inner side of the first widening 20, the conical inner face of the first bridge part 19, respectively.

In this embodiment, too, a third widening 25 is provided, but same has a diameter larger than that of the second widening and is connected therewith by means of a bridge part 26. The third widening merges then in a meanwhile known way into a narrowing 27 of the material of the pipe at the mouth thereof. The retaining ring consists in a way corresponding to the first embodiment of a part 28 which is within the third widening 25 and which by its end edge 28' is retained by the narrowing 27, the arrangement being, however, at an enlarged diameter as compared with the first embodiment. The retaining ring contacts by a narrowing 29 the bridge part between the second and third widening 22, 25 respectively of the pipe and at the location 30 its diameter is much smaller than at the location 28. In this way a space is created for the sealing ring body 23. Finally the retaining ring is again slightly outwards bent over at the location 31 so that at the location 32 in the bridge part between the sealing ring body 23 and the sealing ring lip 23' a sufficiently strong narrowing of the material is produced in order to avoid that the rubber material 23 during the insertion of the pipe 24 could be pulled from the space between the second widening of the pipe and the part 30 of the retaining ring.

In this embodiment the inner diameter of the part 30 of the retaining ring can be easily larger than the outer diameter of the pipe 24 (which for the rest is evidently equal to the diameter of the undeformed pipe part 18 on which the coupling part is formed). Due to the sufficiently long lip 23' of the rubber sealing a dependable sealing of the rubber material on the pipe part 24 is obtained, while the lip 23' on inserting the pipe 24 also presses the pipe area 20 and/or 21 in order to seal on the outer side. Nevertheless it is possible that the directions of the axes of the pipes 18 and 24 may make an angle with each other which for particular cases of application is advantageous.

What I claim is:

1. A pipe coupling with a pipe end to be inserted in a sleeve-shaped coupling part, the coupling part comprising a stepped cylindrical widening of the pipe toward the coupling, a first widening having an inner diameter larger than the outer diameter of the pipe end to be inserted in the coupling, a second widening having a wall radially constricted relative to said first widening, an annular groove formed in said second widening and defined in part by said radially constricted wall, a sealing ring of elastomeric material, said ring being provided with a lip directed inwards at an angle the smallest diameter of which in its free condition is smaller than the inner diameter of the pipe to be inserted, said sealing ring being in said annular groove, and ring means radially retaining said sealing ring within said annular groove and said retaining ring and groove holding the sealing ring against axial movement and said retaining ring contacting an abutment face proximate the end of the coupling and including at least a portion of said coupling part and said retaining ring.

2. A pipe coupling according to claim 1, wherein the widened part of the retainer ring over substantially its entire circumference is provided with a number of axial notches of a length such that the widened part of the retaining ring as a whole becomes deformable.

3. A pipe coupling with a pipe end to be inserted in a sleeve-shaped coupling part, the coupling part comprising a stepped cylindrical widening of the pipe toward the coupling, a first widening having an inner diameter larger than the outer diameter of the pipe end to be inserted in the coupling, a second widening, an annular groove formed in said second widening, a sealing ring of elastomeric material, said ring being provided with a lip directed inwards at an angle the smallest diameter of which in its free condition is smaller than the inner diameter of the pipe to be inserted, said sealing ring being in said annular groove, and retaining ring means having a projection extending radially of said coupling and engaging said sealing ring which together with said second widening retains said sealing ring within said annular groove and said retaining ring and groove holding the sealing ring against axial movement and said retaining ring contacting an abutment face proximate the end of the coupling and including at least a portion of said coupling part and said retaining ring.

* * * * *